May 24, 1960 J. P. ECKERT, JR., ET AL 2,938,193

CODE GENERATOR

Filed June 10, 1955 3 Sheets-Sheet 1

INVENTORS
J. PRESPER ECKERT, JR.
MARVIN JACOBY

BY Charles C. English
AGENT

May 24, 1960 J. P. ECKERT, JR., ET AL 2,938,193

CODE GENERATOR

Filed June 10, 1955 3 Sheets-Sheet 2

*INVENTORS*

J. PRESPER ECKERT, JR.

MARVIN JACOBY

*BY* Charles E. English

*AGENT*

May 24, 1960 J. P. ECKERT, JR., ET AL 2,938,193

CODE GENERATOR

Filed June 10, 1955 3 Sheets-Sheet 3

INVENTORS
J. PRESPER ECKERT, JR.
MARVIN JACOBY

BY Charles E. Enfield

AGENT

United States Patent Office 2,938,193

Patented May 24, 1960

2,938,193

CODE GENERATOR

John Presper Eckert, Jr., Gladwyne, and Marvin Jacoby, Norristown, Pa., assignors to Sperry Rand Corporation, New York, N.Y., a corporation of Delaware Filed June 10, 1955, Ser. No. 514,630

14 Claims. (Cl. 340—168)

This invention relates to an electronic code generator and more particularly to a means for generating electrical voltage or current signal pulses in accordance with any selected code.

In the electronic digital computer art and in the communications art it is often necessary to generate a series or train of current or voltage signal pulses (herein called a digit) in a predetermined sequence, wherein each sequence of pulses expresses information in a binary form. Each digit takes the form of a pulse train, wherein pulses are present or absent in a coded arrangement which identifies a particular digit. The binary 1 denotes the presence of a pulse of a particular polarity; the binary 0 denotes the absence of a pulse of a particular polarity. Both binary 1's and binary 0's are generated in identical time intervals.

The position and number of pulses in the series can be made to vary, so that new significance may be given to each variation. The manner and rate in which the series is permuted will, of course, determine the code. Intelligence derived from such a procedure may be used, for example, as timing signals or for comparing a known set of pulses with a set of unknown pulses.

In the past code generators were constructed to produce outputs which varied from a first binary coded output sequentially to a final binary coded output without internal provisions for skipping intermediate code positions. The present invention concerns a code generator with selectively operable internal provisions for skipping undesirable or unused code combinations.

Accordingly some of the objects of this invention are:

To provide a novel binary counting circuit with internal provisions for skipping one or a plurality of undesired outputs.

To provide a novel binary counting circuit with internal provisions for skipping a set or plurality of sets of sequential undesired outputs.

To provide a novel binary counting circuit with internal provisions for selectively skipping one or a set of undesired outputs.

A further object of this invention is to provide a circuit which will perform a counting function and also provide additional control signals for other dependent apparatus.

Other objects of this invention will be apparent to those skilled in the electronic art as the specification for this invention is read.

Figure 1:
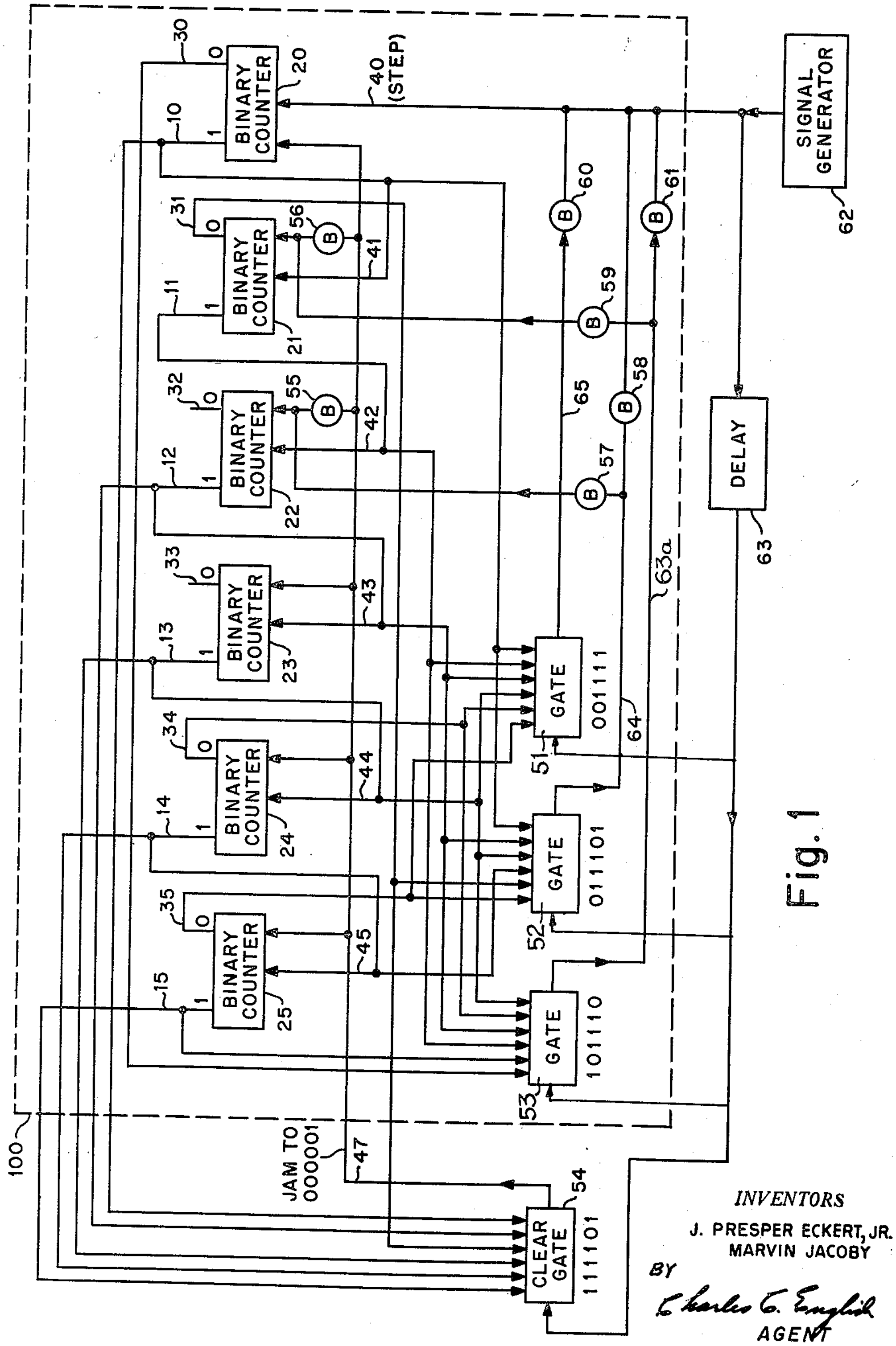
Figure 2:
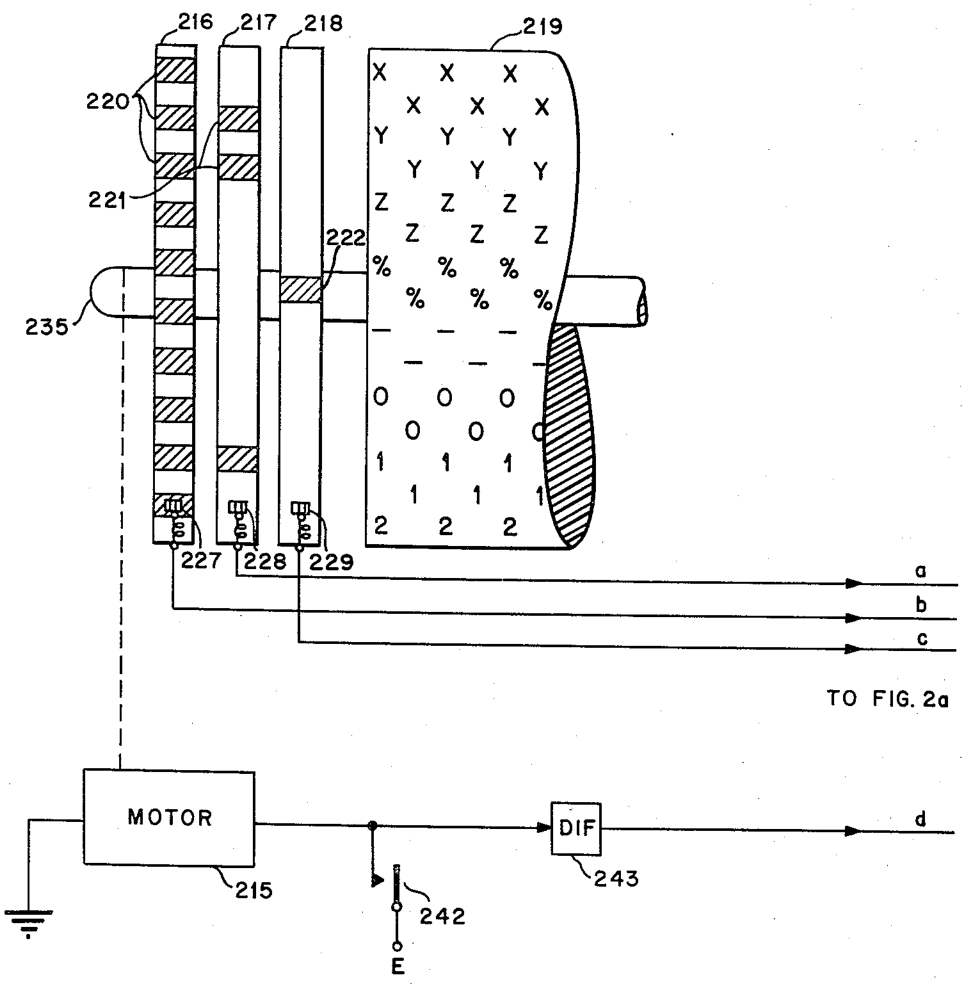
Figure 2A:
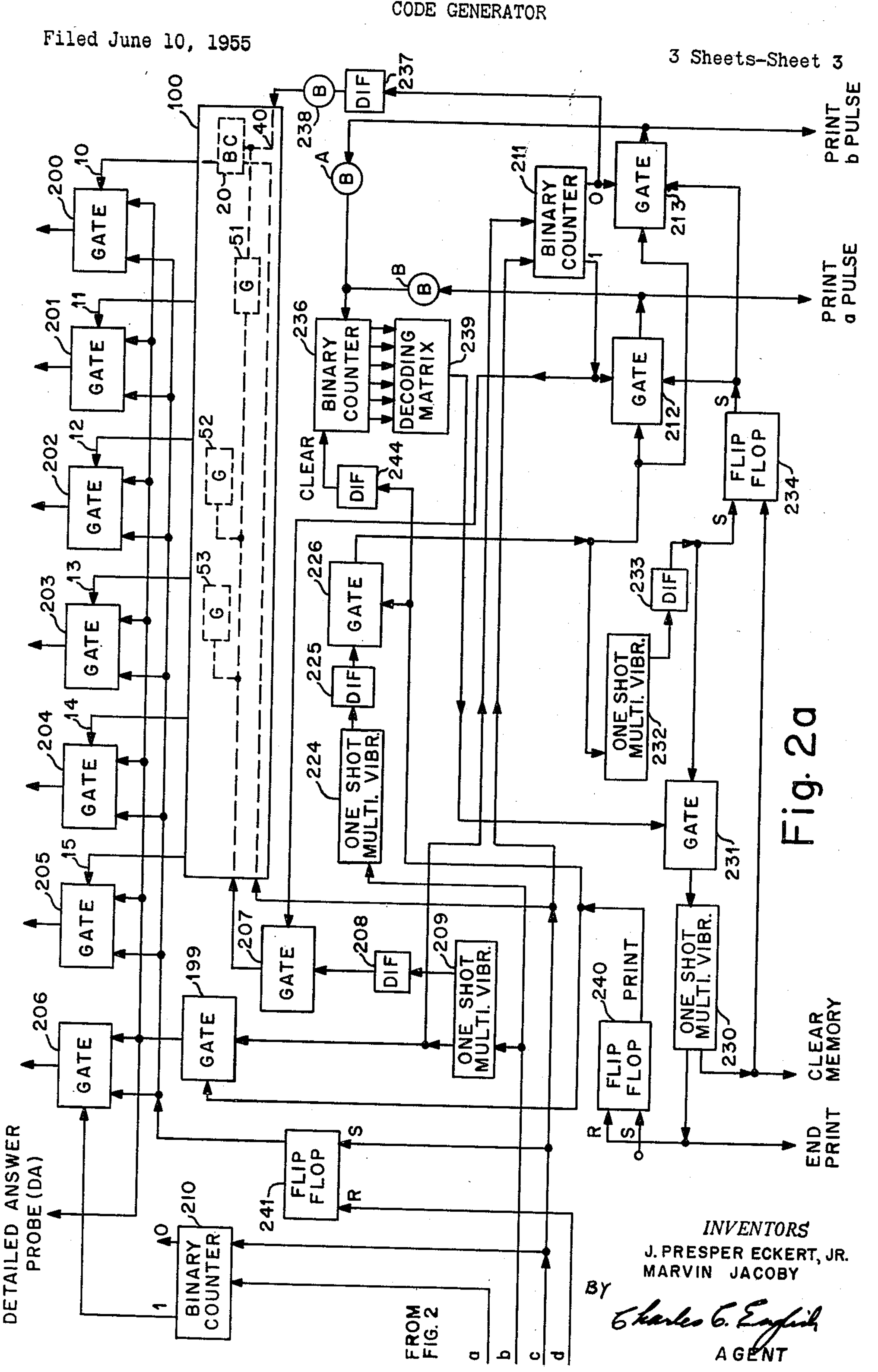

The manner in which the foregoing and other objects are obtained will more fully appear when the following specification is read in connection with the drawings, wherein, Figure 1 is a block diagram of one embodiment of this invention;

Figures 2 and 2*a* illustrate a block diagram of another embodiment of this invention.

The present invention comprises, in general, a set of "*n*" binary counters which is controlled by a group of electronic gates and buffers and stepped by the output of a signal generator. The binary counter used in this invention may be, but is not limited to, a "modulo 2 counter" as shown in Figure 3–2, page 15 of the book "High-Speed Computing Devices," written by the staff of Engineering Research Associates, Inc. and published by McGraw-Hill Book Company in 1950. These binary counters (modulo 2 counters) may be connected in serial fashion to form a radix 2 counter (Figure 3–4, page 18, "High-Speed Computing Devices"). If "*n*" binary counters are connected in series, then the radix 2 counter that is formed is capable of indicating a value equal to $2^n-1$. It should be expressly noted that the binary counters used in this invention need not comprise electronic valves but may include magnetic amplifiers, transistors, or any combination thereof.

Being bistable devices, binary counters are inherently capable of developing two distinct outputs. One output is arbitrarily noted as the 1 output; the other is noted as the 0 output. However, it should be noted, that a given output is produced only once for every two input signals. Significance may be attached to either output.

It is well known in the art that a series of binary counters may be preset to any desired output lower than the highest count possible ($2^n-1$) by jamming or clearing the counters. An example of such a clearing procedure is shown in Patent No. 2,536,035 entitled "Means For Producing a Variable Number of Pulses." Clearing or jamming the counters means ensuring that particular ones in each pair of translating means comprising a counter in a chain are caused to be in their significant states. The final method chosen for jamming will depend upon the type of signal translating devices used in the binary counter.

In the block diagrams (Figures 1, 2, and 2*a*) illustrating the invention, signals to the "0" input of the binary counter will cause the counter to produce a "0" output; signals to the "1" input of the binary counter will cause the counter to produce a "1" output. The "0" and "1" inputs are used to jam the counter to a desired output. Signals to the step input of a counter will cause the counter to change, its output state from 1 to 0 or from 0 to 1.

The gates used in this invention are electrical circuits having one output and a multiplicity of inputs so designed that an output is produced only when a certain set of input conditions is met. One group of circuits which accomplishes this gating function has been described in U.S. Patent No. 2,557,729, entitled "Impulse Responsive Network."

The buffers used herein are isolating devices and may be, for example a vacuum tube, or any other type of unidirectional conductor.

Referring now to Figure 1, there is shown a set of six binary counters 20 to 25 connected serially and capable of indicating values from 0 to 63 expressed in binary form as values from 000000 to 111111. Output lines 10 to 15 are connected to the "1" outputs of counters 20–25 respectively, and output lines 30 to 35 are connected to the "0" outputs of the same counters. The "1" output of each counter is connected to the step input of the next counter in the series. Thus output line 10 is connected to input 41, output 11 is connected to input 42, etc. The step input 40 of binary counter 20 is connected to the outptu of signal pulse generator 62, which may be but is not limited to a conventional sine wave oscillator. The function of the signal pulse generator 62 is to produce pulses to be counted; these pulses are introduced to the counter via step input 40. Each pulse from the signal generator 62 to the step input 40 causes binary counter 20 to change state. When binary counter 20 changes state from 1 to 0, an output is coupled to the step input 41 of binary counter 21, which then changes its output state. When any binary counter changes state from a "1" output to a "0" output, a pulse is introduced to the step input of the next counter in the chain. Thus it is evident that pulses emanating from signal pulse generator 62 cause the binary counters to produce outputs sequentially from binary values of 000000 to 111111. Therefore, unless provisions are made for skipping selected outputs of the binary counters, every value from 9 to $2^n-1$ will be generated. Gates 51 to 54, which are connected in the following manner to selected outputs of binary counters 20 to 25, provide the necessary jamming signals to enable the binary counters to skip any set of undesirable outputs. The "1" output of counters 20, 22, 23, 24 and 25 and the "0" output of counter 21 are connected to the inputs of gate 54; the "1" output of counters 21, 22, 23, and 25 and the "0" output of counters 20 and 24 are connected to the several inputs of gate 53; the "1" output of counters 20, 22, 23, and 24 and the "0" output of counters 21 and 25 are connected to the several inputs of gate 52; and the "1" output of counters 20, 21, 22, and 23 and the "0" output of counters 24 and 25 are connected to the several inputs or gate 51. Although "0" outputs 32 and 33 of binary counters 22 and 23 are not used, it will be obvious that they may be used depending on which binary values of the counters are to be skipped. Each gate 51–54 is conditioned to produce an output when all the inputs connected thereto are energized.

The final conditioning pulse necessary for gates 51 to 54 to produce an output is generated by the signal pulse generator 62. Its output is connected through delay network 63 to one input of all the aforementioned gates. As previously mentioned, the output of the signal pulse generator is also directly connected to the step input of binary counter 20. Due to the delay network 63 the final conditioning pulse is not present at gates 51 to 54 until after the binary counters 20 to 25 have produced an output in response to a pulse from the signal pulse generator 62. Thus gates 51 to 54 will not produce an output until sometime after the binary counters have responded to the last pulse from the signal pulse generator 62. The lag inherent in the delay network 63 should be less than the reciprocal of the frequency of the signal pulse generator 62.

The output of gate 54 is connected through line 47 to the "0" inputs of binary counters 23, 24, and 25 and is connected to the "0" inputs of counters 21 and 22 through line 47 and buffers 55 and 56 respectively. Additionally, the output of gate 54 is connected via line 47 to the "1" input of binary counter 20. The output of gate 53 is connected through line 63a and buffers 59 and 61 to the "0" input and step input 40 of binary counters 21 and 20 respectively; the output of gate 52 is connected through line 64 and buffers 57 and 58 to the "0" input and step input 40 of counters 22 and 20 respectively; and the output of gate 51 is connected through line 65 and buffer 60 to the step input 40 of binary counter 20.

The output of the binary counters 20 to 25 may be used to represent any desired series of characters. The following chart illustrates one such series of characters that may be represented by serially generated binary code combinations.

| 1 Output From BC 20 | 1 Output From BC 21 | 1 Output From BC 22 | 1 Output From BC 23 | 1 Output From BC 24 | 1 Output From BC 25 | Character |
|---|---|---|---|---|---|---|
| 0 | 0 | 0 | 0 | 0 | 0 | Not used |
| 0 | 0 | 0 | 0 | 0 | 1 | Not used |
| 0 | 0 | 0 | 0 | 1 | 0 | - |
| 0 | 0 | 0 | 0 | 1 | 1 | 0 |
| 0 | 0 | 0 | 1 | 0 | 0 | 1 |
| 0 | 0 | 0 | 1 | 0 | 1 | 2 |
| 0 | 0 | 0 | 1 | 1 | 0 | 3 |
| 0 | 0 | 0 | 1 | 1 | 1 | 4 |
| 0 | 0 | 1 | 0 | 0 | 0 | 5 |
| 0 | 0 | 1 | 0 | 0 | 1 | 6 |
| 0 | 0 | 1 | 0 | 1 | 0 | 7 |
| 0 | 0 | 1 | 0 | 1 | 1 | 8 |
| 0 | 0 | 1 | 1 | 0 | 0 | 9 |
| 0 | 0 | 1 | 1 | 0 | 1 | ' |
| 0 | 0 | 1 | 1 | 1 | 0 | & |
| 0 | 0 | 1 | 1 | 1 | 1 | ( |
| 0 | 1 | 0 | 0 | 0 | 0 | Not used |
| 0 | 1 | 0 | 0 | 0 | 1 | , |
| 0 | 1 | 0 | 0 | 1 | 0 | . |
| 0 | 1 | 0 | 0 | 1 | 1 | ; |
| 0 | 1 | 0 | 1 | 0 | 0 | A |
| 0 | 1 | 0 | 1 | 0 | 1 | B |
| 0 | 1 | 0 | 1 | 1 | 0 | C |
| 0 | 1 | 0 | 1 | 1 | 1 | D |
| 0 | 1 | 1 | 0 | 0 | 0 | E |
| 0 | 1 | 1 | 0 | 0 | 1 | F |
| 0 | 1 | 1 | 0 | 1 | 0 | G |
| 0 | 1 | 1 | 0 | 1 | 1 | H |
| 0 | 1 | 1 | 1 | 0 | 0 | I |
| 0 | 1 | 1 | 1 | 0 | 1 | # |
| 0 | 1 | 1 | 1 | 1 | 0 | Not used |
| 0 | 1 | 1 | 1 | 1 | 1 | Not used |
| 1 | 0 | 0 | 0 | 0 | 0 | Not used |
| 1 | 0 | 0 | 0 | 0 | 1 | Not used |
| 1 | 0 | 0 | 0 | 1 | 0 | Not used |
| 1 | 0 | 0 | 0 | 1 | 1 | ) |
| 1 | 0 | 0 | 1 | 0 | 0 | J |
| 1 | 0 | 0 | 1 | 0 | 1 | K |
| 1 | 0 | 0 | 1 | 1 | 0 | L |
| 1 | 0 | 0 | 1 | 1 | 1 | M |
| 1 | 0 | 1 | 0 | 0 | 0 | N |
| 1 | 0 | 1 | 0 | 0 | 1 | O |
| 1 | 0 | 1 | 0 | 1 | 0 | P |
| 1 | 0 | 1 | 0 | 1 | 1 | Q |
| 1 | 0 | 1 | 1 | 0 | 0 | R |
| 1 | 0 | 1 | 1 | 0 | 1 | $ |
| 1 | 0 | 1 | 1 | 1 | 0 | * |
| 1 | 0 | 1 | 1 | 1 | 1 | Not used |
| 1 | 1 | 0 | 0 | 0 | 0 | Not used |
| 1 | 1 | 0 | 0 | 0 | 1 | Not used |
| 1 | 1 | 0 | 0 | 1 | 0 | : |
| 1 | 1 | 0 | 0 | 1 | 1 | + |
| 1 | 1 | 0 | 1 | 0 | 0 | / |
| 1 | 1 | 0 | 1 | 0 | 1 | S |
| 1 | 1 | 0 | 1 | 1 | 0 | T |
| 1 | 1 | 0 | 1 | 1 | 1 | U |
| 1 | 1 | 1 | 0 | 0 | 0 | V |
| 1 | 1 | 1 | 0 | 0 | 1 | W |
| 1 | 1 | 1 | 0 | 1 | 0 | X |
| 1 | 1 | 1 | 0 | 1 | 1 | Y |
| 1 | 1 | 1 | 1 | 0 | 0 | Z |
| 1 | 1 | 1 | 1 | 0 | 1 | % |
| 1 | 1 | 1 | 1 | 1 | 0 | Not used |
| 1 | 1 | 1 | 1 | 1 | 1 | Not used |

In the chart the symbol "0" indicates there is no "1" output from the binary counter, and the symbol "1" indicates that there is a "1" output from the binary counter. It should be noted that with 6 binary counters more code combinations are produced than are necessary here. Thus it is desirable that the time to generate code combinations which do not represent characters be eliminated. Gates 51 to 54 produce signals which allow the binary counters to skip any code combinations which do not represent characters. For example, code combinations 011110, 011111, 100000, 100001, and 100010 are not used, and therefore, it is desirable that pulses from signal pulse generator 62 not be used to step the counter to produce these outputs. Consequently, when the counter produces the code representation of # (011101), gate 52 permits a delayed pulse from the signal pulse generator 62 to pass through the said gate producing an output on line 64. The output of gate 52 jams binary counter 22 to the "0" output, thereby causing a chain reaction to step binary counters 23 and 24 to their "0" output states. In addition, the output of gate 52 steps binary counter 20 causing it to change state from "1" to "0." When binary counter 20 changes state from "1" to "0" a signal pulse from the "1" output of binary counter 20 is fed through line 10 to the step input 40 of binary counter 21 to change its output state from "0" to "1." Thus the six binary counters are caused to produce an output of 100010. The next pulse from the signal pulse generator steps the counter, which then produces a desired code representation (100011). In like manner the output of gate 51 eliminates the time necessary to generate the unused code output 010000, and the output of gate 53 is used to eliminate the time necessary to generate the unused code outputs 101111, 110000, and 110001.

The output of gate 54 also serves to jam the counter to a preselected count. However, the function of this gate 54 is in some respects different from the function of gates 51–53. The outputs of the latter gates are used to eliminate undesirable intermediate outputs from the binary counter, whereas the output of gate 54 is used to determine the initial and final outputs of the counters. As previously stated, the counter may indicate values for 0 to 63 (000000 to 111111); however, as shown by chart I the first two outputs of the counter and the last two outputs of the counter are not used. When the counter produces the code representation of % (111101), gate 54 permits a delayed pulse from the signal pulse generator to pass through said gate producing an output on line 47. The output of gate 54 is connected to all the binary counters in the chain as previously described and jams the counter to an output of 000001. The next pulse from the signal pulse generator steps the counter, which produces the desired initial code representation "-" (000010).

Whereas Figure 1 shows only four gates and therefore four sets of outputs to be skipped, it is evident that any number of gates may be employed to enable the counters to skip any one or set of undesirable outputs.

Figures 2 and 2*a* show another embodiment of this invention which may be used in conjunction with the devices described in the following copending applications entitled; "High Speed Printer," Serial No. 486,206, filed by John Presper Eckert, Jr. and Earl E. Masterson on February 2, 1955, "Comparator," Serial No. 514,629, now Patent No. 2,842,663, dated July 8, 1958, filed by John Presper Eckert, Jr. and A. W. Reichard on June 10, 1955 and, "High Speed Printer," Serial No. 514,852 filed by Marvin Jacoby on June 13, 1955. Part of Figure 1, namely the block labeled 100 is incorporated into Figure 2. Essentially the device shown in Figure 2 performs the same primary function as the device shown in Figure 1. However, in the second device the mode of stimulating the binary counters 100 has been changed, the code output has been altered, and additional control signals are generated. Moreover, Figures 2 and 2*a* contain circuit elements not used in the first embodiment, e.g. the one shot multivibrator, the differentiator, and the flip flop. These circuits are sufficiently well known in the electronic art as to not need an explanation here of their operation.

The stimulation for the counter in the second embodiment of this invention is generated as herein illustrated by the action of three commutator wheels 216, 217, and 218, which are mechanically ganged with a type wheel 219 on a common shaft 235 (see Fig. 2). The type wheel contains, in a typical example, 102 horizontal rows of equally spaced characters. Two rows, as shown, are devoted to each character. Thus there are 51 different characters that can be printed. Each pair of rows, consisting of the same characters, is arranged so that the first row apposed to the print hammer is printed in the odd-numbered columns, and the second row to be apposed to the print hammer is printed in the even-numbered columns. The type wheel and its relation to a complete printing apparatus including printing hammers is more fully described in the copending application entitled High Speed Printer, Serial No. 486,206.

The three commutator wheels are functionally described as the index pulse wheel 216, the odd-even wheel 217, and the clear wheel 218. The latter wheel takes the place of the clear gate 54, Fig. 1, as will be made more fully apparent hereinafter. Brushes 227, 228, and 229 carry off a signal pulse every time contact is made with the conducting members 220, 221, and 222 of their respective commutator wheels 216, 217 and 218.

The index pulse wheel 216, which takes the place of the pulse generator 62 (Fig. 1), has 102 conducting members 220 which correspond to the 102 rows of characters that may be on the type wheels. At the time a row of characters is apposed to the print hammers a conducting member 220 of the index pulse wheel 216 contacts brush 227, and an index pulse is generated. Index pulses are used to stimulate the counter 100 and to produce other control signals in a manner as will now be described. Signal pulses from the index wheel conducting members 220 are connected through brush 227 to the inputs of a pair of one shot multivibrators 209 and 224 (Fig. 2*a*). As is known, a one shot multivibrator is capable of generating two outputs from one signal input pulse. The two output signal pulses are the pulse generated when the one shot multivibrator is first simulated and changes output state, herein called the first or undelayed output; and the delayed pulse developed when the one shot multivibrator resumes its normal stable state, herein called the second or delayed output. The two signals are produced separately in time, the duration of the separation being a function of the design of the one shot multivibrator.

Typically, the time lag in producing the delayed output from one shot multivibrator 209 may be 300 microseconds, and the time lag in producing the delayed output from one shot multivibrator 224 may be 250 microseconds. Both outputs of one shot multivibrator 209 are used; the delayed output is connected to the inputs of counter skip gates 51, 52, and 53 through differentiator 208 and gate 207, and the first or undelayed output is connected through gate 199 to one input of a series of code output gates 200 to 206, and to the step input of binary counter 211. Parenthetically, it should be mentioned that the output of gate 199 may be used as a control signal for other devices. In copending application Serial Number 486,206 supra, the output of gate 199 is applied to line 544 (see Fig. 5) and indicates the presence of binary signals from the code generator; in copending applications on a "Comparator," Serial No. 514,629 now Patent No. 2,842,663, dated July 8, 1958 supra and on a "High Speed Printer," Serial No. 514,852 supra, the output of gate 199 is applied to a comparator circuit and is called a detailed answer probe (DA).

Code output gates 200 to 205 require the coincidence of three signals before they will transmit an output from the binary counter code generator 100. These signals emanate from the "1" outputs of binary counters 20 to 25 respectively, the undelayed output of one shot multivibrator 209, and the set output of flip-flop 241. Gate 206, the check or odd-even pulse output gate, also requires three coincident input signals before it will transmit an output. The three inputs to gate 206 come from the "1" output of binary counter 210, the set output of flip-flop 241, and the undelayed output of one shot multivibrator 209. The operation of gate 206 and binary counter 210 will be discussed later in the specification in the section entitled "Odd-Even Pulse Insertion," and the operation of flip-flop 241 will be discussed in the section entitled "Initial Synchronization of the Code Output to the Type Wheel."

Binary counter 211 is stepped every time a pulse is generated at the first (undelayed) output of one shot multivibrator 209 due to the action of the index pulse wheel 216. The "0" and "1" outputs of binary counter 211 control the passage of signals through gates 207, 213 and 212. The "0" output of binary counter 211 is connected to one input of gate 213 and to the step input 40 of binary counter 20 through differentiator 237 and buffer 238; the "1" output of binary counter 211 is connected to the inputs of gates 207 and 212. Outputs from gates 212 and 213 may be used as control signals for the high speed printers described in copending U.S. Application, Serial Number 486,206 supra, and an Application having Serial No. 514,852 filed by Marvin Jacoby. In the aforementioned copending applications the output from gate 213 may be used as a "print (*a*)" pulse, and a delayed output from said gate, which may be derived in any known manner, may be used as "check (*a*)" pulse. The output from gate 212 may be used as a "print (b)" pulse and a delayed output from said gate may be also derived from this gate and used as a "check (b)" pulse.

However, before gates 213 and 212 will transmit a signal, they must receive coincident inputs from the delayed output of one shot multivibrator 224 and the set output of flip-flop 234 in addition to the signal from the "0" or "1" output of binary counter 211. The delayed output of one shot multivibrator 224 is connected through differentiator 225 and gate 226 to the inputs of gates 212 and the input of 213 and one shot multivibrator 232. The second or relayed output from one shot multivibrator 232 is connected through differentiator 233 to the set input of flip-flop 234 and to one input of gate 231. The set output of flip-flop 234 is in turn connected to the inputs of gates 212 and 213. Outputs of gates 212 and 213 which occur in response to the delayed output from one shot multivibrator 224 are transmitted to 102 counter 236 through buffers A and B respectively. 102 counter 236 may comprise a group of "n" binary counters the outputs of which are decoded through a matrix 239. Matrix 239 in turn produces an output pulse when the counter has received 102 pulses. Functionally, 102 counter 236 and matrix 239 serve to indicate that 102 pulses from the index wheel have been generated (i.e., 102 pulses from the type wheel have stepped binary counter 211) and that the type wheel has made one complete revolution. The output of the decoding matrix 239 is connected to one input of gate 231, the output of which is in turn connected to the input of one shot multivibrator 230. The first output of one shot multivibrator 230 is connected to the reset input of flip-flop 240 and the second output of one shot multivibrator 230 is connected to the reset input of flip-flop 234. Said first output of one shot multivibrator 230 may be used to indicate that the code generating cycle is at an end and is called the end print signal and the second output may be used as a clear memory pulse in the device described in U.S. Application Serial No. 486,-206, and as a clear memory and read start signal in the application on the "High Speed Printer", No. 514,852, supra.

The clear wheel 218 (Fig. 2) has one conducting member 222 and, therefore only one pulse is produced by this wheel for every 102 pulses produced by the index pulse wheel. The pulse from the clear wheel primarily serves to orient the output of the code generator with the characters on the type wheel apposed to the print hammers.

Conducting member 222 is positioned on clear wheel 218 so that it will cause a clear pulse to be produced when no other stimulus to the code generator is being produced by either the index pulse wheel 216 or the odd-even wheel 217. This positioning of conducting member 222 is maintained so that the code generator is cleared at a time when it is not receiving an input from any other source.

Signal pulses from the conducting member 222 of the clear wheel 218 are connected through brush 229 to the "0" input of binary counter 210, the "1" input of binary counter 211, and to the set input of flip-flop 241. Further brush 229 is connected to the binary counter 100 in the same manner as the output of gate 54. The set output of flip-flop 241 is connected to one input of gates 200 to 206.

The output of the code generator shown in Figure 1 is slightly different from the code output of the device described in Figure 2. The output of the former device is a six-position code, whereas the output of the latter device is a seven-position code. Pulse position seven is added to contain a "check-pulse," designed to help detect the gain or loss of a binary pulse. Although a complete analysis of this error detection process is not in the purview of this application, it should suffice to say that the number of pulses comprising a digit are periodically counted and if the number of pulses per digit is even, an error is noted. The check pulse is present, or absent, according as it is, or is not, necessary to make the number of pulses representing any character odd. The first six positions in both codes, however, represent identical characters. The "1" output lines 10 to 15 of binary counters 20 to 25 are connected to the inputs of gates 200 to 205 respectively, said gates transmitting the first 6 possible pulses in the 7 position code.

The odd-even wheel 217 has 34 conducting members spaced so that a pulse is generated whenever a change in odd-even requirements occurs.

Signal pulses from the odd-even-wheel conducting members 221 are connected through brush 228 to the step input of binary counter 210. The "1" output of binary counter 210 is connected to one of the inputs of gate 206, which transmits the odd or seventh pulse.

The motor drive switch 242 (Fig. 2) connects a source of potential E to the motor 215, which drives the shaft 235 causing the three commutator wheels 216, 217 and 218 and the type wheel 219 to rotate. In addition, this source of potential E is connected through the motor drive switch 242 and differentiator 243 to the reset input of flip-flop 241.

The start signal pulse which may be applied at any time through terminal S, is connected to the set input of flip-flop 240. The set output of flip-flop 240 is connected to one input of gates 199 and 226 and to the jam-to-zero input of counter 236 through differentiator 244. No particular time relationship need exist between the application of the start signal and the position of the three commutator wheels and type wheel.

*Operation*

Presuming that the motor drive switch 242 is closed and the start signal pulse is not present, i.e. flip-flop 240 is reset, then the following operation will take place: motor 215 drives the three commutator wheels 216, 217 and 218 and type wheel 219 through shaft 235 at a speed which may be for example, approximately a thousand revolutions per minute. Since there are 102 conducting members 220 on index wheel 216 a pulse from the index wheel 216 is transmitted approximately every 600 microseconds through brush 227 to the inputs of one shot multivibrators 209 and 224. The undelayed output of one shot multivibrator 209 is applied to the step input of binary counter 211 and is selectively transmitted through gate 199 to the inputs of gates 200 to 206. The delayed differentiated output of one shot multivibrator 209 is selectively connected through gate 207 to the inputs of gates 51 to 53. The differentiated "0" output from binary counter 211 steps the first binary counter 20 in the chain of counters 100. Binary counter 211 is stepped every 600 microseconds; thus the chain of counters 100 is advanced every 1200 microseconds.

Since the start signal pulse is not present, gate 199, which is connected to the set output of flip-flop 240, will not transmit a pulse from one shot multivibrator 209 to the inputs of gates 200 and 206. Thus, one of the conditions for passing the output of binary counter 100 through gates 200 to 205 is not present and the code generated by the code generator binary counter 100 will not be transmitted.

In addition none of the control signals will be generated until the start signal is present. The second or delayed output of one shot multivibrator 224 is connected to one input of gate 226; the other input of gate 226 is connected to the set output of flip-flop 240. Gate 226 will not transmit a signal until flip-flop 240 is set by a start signal pulse. Since the output of gate 226 is connected to the inputs of gates 212, 213 and one shot multivibrator 232, the end operations signal, the clear memory signal, and the check and print pulse (a and b) cannot be generated until gate 226 receives a conditioning signal from the set output of flip-flop 240.

Presuming that a start signal is present (i.e., flip-flop 240 is set) and the motor drive switch 242 is closed, the manner of operation will change as now set forth; gate 199, which is conditioned by the set output of flip-flop 240, will pass the first output of one shot multivibrator 209 to the inputs of gates 200 to 206. Therefore, the output of code generator binary counter 100 may be transmitted through gates 200 to 205. Gate 226 which is also conditioned by the set output of flip-flop 240 will pass the delayed output of one shot multivibrator 224 and thus gates 212 and 213 are conditioned, and one shot multivibrator 232 will receive an input. One shot multivibrator 232 via its delayed output sets flip-flop 234 which in turn operates to condition gates 212 and 213 at one of their respective input terminals.

The "0" and "1" outputs of binary counter 211 are connected to the inputs of gates 212 and 213 respectively; a "0" output from binary counter 211 alerts gate 213 which transmits a "print and check *a*" pulse; and a "1" output from binary counter 211 alerts gate 212 which transmits a "print and check *b*" pulse. As apparent from the connection of counter 211 to gates 212 and 213, these gates are rendered operative in alternation.

As previously stated, the delayed output from one shot multivibrator 224 is ultimately used to set flip-flop 234. The absence of a conditioning signal from the set output of flip-flop 234 to the input of gates 212 and 213 prevents the first pulse from the index wheel that is transmitted by gate 226 from passing gate 212 or 213. Since the start signal may be applied at any time at terminal S, the set output of flip-flop 240 may be generated at such a time that only part of the differentiated (delayed) output of one shot multivibrator 224 can pass gate 226. This signal might be unreliable; therefore, the first pulse from the index wheel which passes gate 226 is not used. If the first index pulse causes one shot multivibrator 232 to change state, then the differentiated delayed output of one shot multivibrator 232 is applied to the set input of flip-flop 234.

The delay in setting flip-flop 234 prevents the first index pulse, which is transmitted through gate 226, from passing gates 212 or 213. When the next (second) pulse from the index wheel is applied to one shot multivibrator 224, the differentiated delayed output generated by one shot multivibrator 224, which is certain to be clearly defined at the output of gate 226, passes through gate 212 or 213 as the first print and check pulse.

Binary counter 211, which is stepped by each pulse from the index wheel, alternately alerts gates 213 and 212 for 600 microseconds each. The delayed output from one shot multivibrator 224, which may be produced 250 microseconds after binary counter 211 is stepped, passes through gate 212 or 213 to produce either the "check and print *a*" pulse or the "check and print *b*" pulse depending upon which of the two gates is alerted by binary counter 211.

The differentiated set output of the flip-flop 240 clears binary counter 236 to zero; then each index pulse steps counter 236 through the circuit comprising: brush 227, one shot multivibrator 209, binary counter 211, gates 212 and 213 and buffers A and B. When 102 index pulses have been counted, the type wheel 219 has made one complete revolution and each of the 102 horizontal rows 223 of characters has been apposed to the print hammers. The output of binary counter 236 is decoded through matrix 239, which produces a signal when binary counter 236 has received 102 index pulses. The output of matrix 239 permits the second output of one shot multivibrator 232 to pass via differentiator 233 through gate 231 to the input of one shot multivibrator 230. The first output of one shot multivibrator 230 resets flip-flop 240, thereby removing the signals from gates 199 and 226. Therefore no further code outputs may pass through gates 200 to 206 and no further index pulses may pass through gates 212 and 213. However, code generator binary counter 100 still produces code outputs in phase with the type wheel, awaiting the next start signal.

The second output from one shot multivibrator 230 resets flip-flop 234 so that this flip-flop is in its proper state for the next operating cycle.

*Skip*

The code-generator binary counter 100 used in this embodiment of the invention can count to 64. Since the code (see Chart 1) only contains 51 different characters, the counter is made to skip every time a code combination which does not represent a character is generated. The "1" output of binary counter 211 permits the delayed output from one short multivibrator 209 to pass gate 207 and probe gates 51 to 53 every 600 microseconds. The undelayed output from one shot multivibrator 209 probes gates 200 to 206 and steps binary counter 211. When binary counter 211 is stepped to "0," the code-generator binary counter 100 is advanced and the delayed output from one shot multivibrator 209 which occurs after gates 200 to 206 are probed, cannot pass through gate 207. The next undelayed output from one shot multivibrator 209 steps binary counter 211 to a "1" output and after gates 200 to 206 are probed for a second time, the delayed output from one shot multivibrator 209 passes gate 207 and probes gates 51 to 53.

Since there are two rows of like characters for each different character on the type wheel 219, the code-generator binary counter reading cannot be changed before gates 200 to 206 are probed twice. If undesirable code outputs are to be skipped, the code-generator binary counter 100 is jammed to a new reading. The next undelayed output from one shot multivibrator 209 advances the code-generator binary counter 100 to an output representing a character.

The code combination, which is generated by the code-generator binary counter 100 preceding a code combination or combinations that do not represent characters, alerts one of the gates 51, 52 or 53. If binary counter 211 has been stepped to its "1" output, the delayed or second output from one shot multivibrator 209 passes gate 207 and the particular (51, 52 or 53) gate that is alerted, and changes the code-generator binary counter reading to the code combination preceding the next character that should be generated. When the next index pulse steps binary counter 211, the code-generator binary counter 100 is advanced and its reading corresponds to the next character that should be generated.

*Example of a skip*

When the code generator binary counter 100 reads 011101 (#) the next reading would be 011110, an output which does not represent a character. However, the 011101 output combination alerts gate 52 (as previously explained) and the next delayed output from one shot multivibrator 209 passes through differentiator 208, gate 207 and gate 52 and changes the code binary counter reading to 100010. The delayed output from one shot multivibrator 209 changes the third binary counter 22 to a zero output. As a result binary counters 23, 24, and 25 in the chain of counters 100 are stepped. The delayed or second output from one shot multivibrator 209 also steps binary counter 20. The new code output still does represent a character. However the next "0" output from binary counter 211 steps binary counter 20 and the new output (100011) from the code generator represents the ")" character. A similar sequence occurs when the code-generator binary counter 100 reading is 001111 or 101110.

The particular code outputs to be skipped are representative only and it should be understood that any code output or output from binary counter 100 may be suppressed.

*Clearing*

When the code-generator binary counter 100 produces a coded output of 111101 (%) the code combinations that follow are skipped in another manner. Conducting member 222 on clear wheel 218 is positioned so that it will contact brush 229 when the "%" character is apposed to the print hammer. The pulse emanating from the clear wheel changes the binary counter reading to 000001 and jams binary counter 211 to its "1" output state. The next pulse from the index wheel 216 steps binary counter 211 to its "0" output state, and the differentiated "0" output advances code-generator binary counter 100 to a 000010 output. This code output corresponds to the "– –" which is apposed to the print hammers.

*Odd-even pulse insertion*

The pulse emating from the clear wheel 218 also jams counter 210 to its "0" output state. Binary counter 210 remembers whether or not the combination in the code-generator binary counter 100 requires a binary "1" to make it odd. If a binary "1" is required, binary counter 210 is stepped to its "1" output state and remains in that state until a combination that requires no binary "1" is in the code-generator binary counter 100. If the odd pulse (a binary "1") is not required, then binary counter 210 is stepped to its "0" output state by a pulse emanating from the odd-even wheel 217. It remains in the "0" output state until the combination in the code-generator binary counter 100 again requires a binary "1."

The conducting members 221 on the odd-even wheel 217 are so spaced that a pulse is carried off by brush 228 to the step input of binary counter 210 whenever a change in the odd-even requirements occurs. The "1" output of binary counter 210 is applied directly to gate 206.

The seven outputs from the array of gates are always representative of the character that is apposed to the print hammers.

*Initial synchronization of code output to the type wheel*

When the motor drive switch 242 is first closed, any character on the type wheel 219 may be apposed to the print hammer. If, for example, the character "U" were apposed to the print hammers, the first index pulse detected would cause the code generator binary counter 100 to yield an output of 000001. However, the code in this particular case (see Chart 1) indicates that the code output representing the character "U" is 110111. When the next pulse from the index wheel is counted by the code generator binary counter 100, the letter "V" would be apposed to the print hammers, and the code generator binary counter output would be 000010. Chart 1 indicates that the code output for the character "V" should be 111000. Consequently the code generator binary counter 100 would be indicating erroneous code outputs. However, before the outputs of the code-generator binary counter 100 may be transmitted, the inputs of gates 200 to 206 must receive a conditioning signal from the set output of flip-flop 241. This flop-flop is initially reset when the motor drive switch 242 is first closed. Closing of the motor drive switch 242 connects a source of potential E to the reset input of flip-flop 241 through differentiator 243. The set input of flip-flop 241 is connected to brush 229; thus, no outputs will be transmitted from the code generator binary counter 100 until conducting member 222 of clear wheel 218 comes in contact with the brush 229. This action need only occur once because further inputs to the set input of flip-flop 241 will not change the state of that flip-flop.

Conducting member 222 on clear wheel 218 is so placed that a pulse is carried through brush 229 to jam the binary counters to 000001 and to set flip-flop 241 when the percent (%) character is apposed to the print hammers. The next pulse from the index pulse wheel causes the binary counters to produce an output of 000010, which represents "–," the character which is then apposed to the print hammers. Thereafter the output of the code generator will be in phase with the character to be printed. Summarizing the above, the output of the code generator will not be in phase (i.e., represent the character to be printed) with the character apposed to the print hammers until conducting member 222 of clear wheel 218 contacts brush 229 at least once. When the clear pulse is first generated flip-flop 241 is set and gates 200 to 206 receive a conditioning signal and outputs from the code generator binary counters may be transmitted therethrough.

The embodiments of the invention illustrated and described herein have been selected for the purpose of clearly setting forth the principles involved. It will be apparent, however, that the invention is susceptible of being modified to meet the different conditions encountered in its use and we therefore aim to cover by the appended claims all modifications within the true spirit and scope of the invention.

What is claimed is:

1. A chain of "*n*" serially connected binary counters for counting sequentially generated electrical signals and for producing parallel outputs in binary form representative of information in a sequence, each counter having at least one input and an output, means for generating electrical signals to be counted, an electrical delay means having an input and an output, said signal generating means being connected to the first binary counter in the chain and to the input of said electrical delay means, gating means connected between the output of selected ones of said binary counters in the chain and to the input of at least one other binary counter in the chain, said gating means being also connected to the output of said delay means for causing said binary counters to generate signals representative of information out of sequence after said binary counters have attained a predetermined output.

2. The combination comprising a chain of "*n*" binary counters for counting sequentially generated electrical signals and for producing a parallel output in binary form representative of information, each binary counter in the chain having a plurality of separate inputs and outputs, means for generating electrical signals to be counted, said signal generating means being connected to one input of the first binary counter in said chain, a gate having a plurality of inputs and one output, at least one of the inputs of said gate being connected to one selected output from at least one binary counter in the chain and wherein the output of said gate is connected to one selected input of at least one binary counter in said chain, whereby the output of the gate determines the next parallel output from said chain of binary counters.

3. The combination comprising, a chain of "*n*" binary counters, each counter in the chain having three inputs and two outputs, wherein a signal appearing at the first of the two outputs represents a "1" output, a signal appearing at the second of the two outputs represents a "0" output, a signal applied to the first of the three inputs produces a "1" output, a signal applied to the second of the three inputs produces a "0" output and a signal applied to the third of the three inputs causes the binary counter to change its output state, said third input being connected to the first output of the counter preceding it in the chain of counters, said signal to said third input representing a change in output state from a "1" output to a "0" output of the preceding counter in the chain of counters, means for producing electrical signals to be counted, the output of said signal generating means being connected to the third input of the first binary counter in the chain of counters, each output from said signal generating means causing the first counter to change its output state, a plurality of gates the inputs of which are connected to selected outputs of at least one counter in the chain and wherein the outputs of said gates are connected to at least one of the three inputs of at least one of the binary counters.

4. The device as defined in claim 3 further comprising an electrical delay element having an input and an output, said input being connected to the output of said means for generating electrical signals and said output being connected to one input of the said gates.

5. In combination, means for sequentially generating electrical signals, counting means having a plurality of outputs and inputs connected to said generating means at one of said inputs for counting said electrical signals and for producing a parallel output in binary form representative of information in a sequence, said counting means having "n" outputs of a first significance and "n" outputs of a second significance, means for selectively adding an "n+1" parallel output of the first significance to the output of said counting means so that the total number of outputs of the first significance has a predetermined remainder when divided by two, and skipping means connected between a portion of the parallel output of said counting means and at least one of the inputs of said counting means for causing said counting means to generate signals representative of information out of sequence after said counting means has attained a predetermined output.

6. In combination, means for sequentially generating electrical signals, counting means having a plurality of separate inputs and outputs connected to said generating means at one of said inputs for counting said electrical signals and for producing a parallel output in binary form representative of information in a sequence, said counting means having "n" outputs of a first significance and "n" outputs of a second significance, means for selectively adding an "n+1" parallel output of the first significance to the output of said counting means so that the total number of outputs of the first significance has a predetermined remainder when divided by two, a first means connected between a portion of the parallel output of said counting means and at least one of the inputs thereof for causing said counting means to generate signals representative of information out of sequence, means for causing said counting means to generate signals representative of information out of sequence after said counting means has attained a predetermined output, a monostable device having an input and a first undelayed and second delayed output, said input of said monostable device being connected to said generating means, means for selectively transmitting said "n" and "n+1" outputs of the first significance, said transmitting means being connected to the first output of said monostable device and being rendered operable by output signals from said first output of said monostable device.

7. In combination, means for sequentially generating electrical signals, counting means connected to said generating means for counting said electrical signals and for producing a parallel output in binary form representative of information in a sequence, said counting means having "n" outputs of a first significance and "n" outputs of a second significance, means for selectively adding an "n+1" parallel output of the first significance to the output of said counting means so that the total number of outputs of the first significance has a predetermined remainder when divided by two, a first means connected to said counting means for causing said counting means to generate signals representative of information out of sequence and a second means controlled by the output of said counting means for causing said counting means to generate signals representative of information out of sequence after said counting means has attained a predetermined output, a monostable device having an input and a first (undelayed) and second (delayed) output, said input of said monostable device being connected to said generating means, a conditional transfer means interposed between said second output of said monostable device and said second means wherein signal outputs from said second output render said second means operable, alternating means having a plurality of inputs and a first and second output wherein signals applied to a selected input produce output signals alternately on said first and second outputs, said selected input of said alternating means being connected to said first output of said monostable device and said first output of said alternating means being connected to said conditional transfer means, whereby signals from said first output of said alternating means render said conditional transfer means operable.

8. The combination set forth in claim 7 further comprising a selectively operable transfer means having a plurality of inputs and an output, a first electrical delay means interposed between said signal generating means and one input of said selectively operable transfer means, a bistable device having two inputs and two outputs, a second electrical delay means interposed the output of said selectively operable transfer means and one input of said bistable device, a first and second gating means, each gating means having three inputs and one output wherein the first inputs of said gating means are connected to the output of said selectively operable transfer means, the second inputs of said gating means are connected to one selected output of said bistable device, the third input of said first gating means is connected to the first output of said alternating means and the third input of said second gating means is connected to the second output of said alternating means, whereby signals alternately pass through said first and second gating means.

9. The combination as set forth in claim 8 further comprising a second means for counting electrical signals and for producing one output signal when said counting means has counted a predetermined number of electrical signals, said second counting means having at least one input and one output, said input of said second counting means being connected to the outputs of said first and second gating means, a third gating means having a first and second input and an output, said first input of said third gating means being connected to the output of said second electrical delay means and said second input of said third gating means being connected to the output of said second counting means, a second monostable device having one input and a first (undelayed) and a second (delayed) output, said input of said second monostable device being connected to the output of said third gating means, whereby output signals developed at said first and second outputs of said second monostable device represent control signals.

10. The combination comprising a chain of "n" binary counters for counting sequentially generated electrical signals and for producing a parallel output in binary form representative of information, each binary counter in the chain having a plurality of separate inputs and outputs, a gate having a plurality of inputs and one output, at least one of the inputs of said gate being connected to one selected output from at least one binary counter in the chain and wherein the output of said gate is connected to one selected input of at least one binary counter in said chain, whereby the output of the gate determines the next parallel output from said chain of binary counters.

11. A chain of "n" serially connected binary counters for counting sequentially generated electrical signals and for producing an output representative of the amount of electrical signals received; each said binary counter in the chain having a plurality of separate inputs and outputs, and gating means connected between selected ones of the outputs and inputs of said binary counters for causing said binary counters to produce outputs representative of an amount of electrical signals received different for the true amount of said signals actually received after said counters have produced a predetermined output, said chain of counters further comprising means for changing the output representative of said new amount by a value equal to one for each signal received thereafter.

12. A chain of "n" serially connected binary counters for counting sequentially generated electrical signals and for producing an output representative of the amount of electrical signals received; each said binary counter in the chain having a plurality of separate inputs and outputs, and a plurality of gates connected between selected ones of the outputs and inputs of said binary counters for causing said binary counters to produce outputs representative of an amount of electrical signals received different from the true amount of said signals actually received after said counters have produced a predetermined output, said chain of counters further comprising means for changing the output representative of said new amount by a value equal to one for each signal received thereafter.

13. A chain of "n" serially connected binary counters for counting sequentially generated electrical signals and for producing a parallel output in binary form representative of information in a sequence, each said binary counter in the chain having a plurality of separate inputs and outputs and gating means connected between selected ones of the outputs and inputs of said binary counters for causing said binary counters to generate signals representative of information out of sequence after said counters have attained a predetermined output.

14. A chain of "n" serially connected binary counters for counting sequentially generated electrical signals and for producing a parallel output in binary form representative of information in a sequence, each said binary counter in the chain having a plurality of separate inputs and outputs, and a plurality of gating means connected between selected ones of the outputs and inputs of said binary counters for causing said counters to generate signals representative of information out of sequence as many times as there are gates after said binary counters have attained a plurality of different predetermined outputs corresponding to the number of gates.

References Cited in the file of this patent

UNITED STATES PATENTS

| | | |
|---|---|---|
| 2,398,771 | Compton | Apr. 23, 1946 |
| 2,403,873 | Mumma | July 9, 1946 |
| 2,621,250 | Spencer | Dec. 9, 1952 |

UNITED STATES PATENT OFFICE

CERTIFICATE OF CORRECTION

Patent No. 2,938,193 May 24, 1960

John Presper Eckert, Jr., et al.

It is hereby certified that error appears in the printed specification of the above numbered patent requiring correction and that the said Letters Patent should read as corrected below.

Column 2, line 62, for "outptu" read -- output --; column 3, line 8, for "9 to $2^n$-1" read -- 0 to $2^n$-1 --; column 5, line 28, for ""High Speed Printer,"" read -- "High Speed Printer", --; line 30, for "Comparator," read -- "Comparator", --; column 6, line 11, for "simulated" read -- stimulated --; column 8, line 58, for "200 and 206" read -- 200 to 206 --.

Signed and sealed this 3rd day of January 1961.

(SEAL)

Attest:

KARL H. AXLINE
Attesting Officer

ROBERT C. WATSON
Commissioner of Patents